March 30, 1926.  B. BANNISTER  1,578,382
CARBURETOR
Filed April 23, 1921
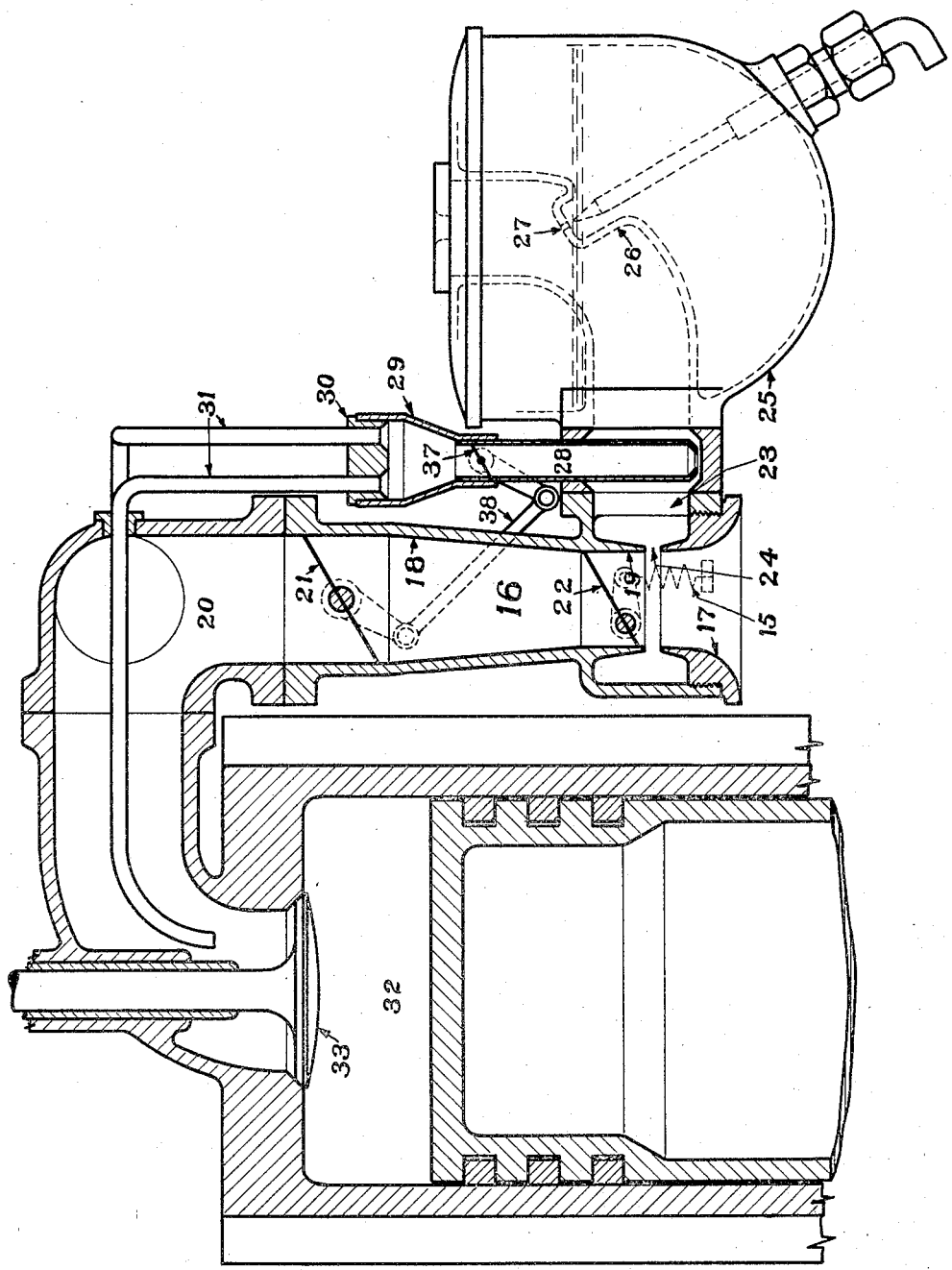
INVENTOR.
Bryant Bannister
BY William B. Wharton
his ATTORNEY.

Patented Mar. 30, 1926.

1,578,382

UNITED STATES PATENT OFFICE.

BRYANT BANNISTER, OF PITTSBURGH, PENNSYLVANIA, ASSIGNOR TO BANNISTER MOTOR APPLIANCE COMPANY, A CORPORATION OF PENNSYLVANIA.

CARBURETOR.

Application filed April 23, 1921. Serial No. 463,802.

To all whom it may concern:

Be it known that I, BRYANT BANNISTER, a citizen of the United States, and resident of Pittsburgh, in the county of Allegheny and State of Pennsylvania, have invented a new and useful Improvement in a Carburetor, of which the following is a specification.

The carburetor of the present invention is of the general type in which a pressure differential caused by total air flow is utilized to produce flow of liquid fuel into the carburetor system.

The object of the invention is to provide means for delivering the fuel mixture initially formed directly to each of the cylinders of an internal combustion engine; thereby securing a fine atomization of the fuel by the secondary pressure differential existing in the intake zone of the carburetor and in each cylinder during the suction stroke therein, and securing the advantage of a vaporization of the fuel by heat at the intake valves of the engine cylinders together with the advantage of obviating possible loss of fuel because of the collection thereof on the walls of the intake manifold of the engine.

The accompanying drawing shows a vertical sectional view through the carburetor.

The device comprises a suitable induction tube 16, which is of general Venturi form, and which comprises inlet cone 17, diffusing cone 18, and the constricted portion or throat 19. Diffusing cone 18 contains the throttle valve 21, and opens into a chamber 20 which is in communication with the intake manifold of the engine. A primary mixing conduit or chamber 23, communicates by way of orifice 24 with the throat 19 of the induction tube 16, and receives liquid fuel from a supply chamber 25 by way of a nozzle 26 having a fuel inlet orifice 27 therein.

During air flow through the induction tube 16, fuel is drawn into the chamber 23 to form a rich mixture therein.

In communication with chamber 23 is a delivery tube 28 for the rich mixture. At its discharge end this tube 28 has an extended portion 29 into which fits a closure 30. Tubes 31 pass through this closure 30, and branch off therefrom to the various cylinders 32 of the engine.

These tubes 31, as shown in the drawing, deliver the fuel directly upon or adjacent the outer surface of the intake valve 33 of the cylinder to which each particular tube leads. As this valve is highly heated, the fuel of the rich mixture is immediately vaporized by contact therewith, and is commingled with the main air charge which has entered the intake manifold of the engine by way of induction tube 16 to form the combustible mixture for the cylinder.

In order to insure a pressure different at all times between the throat of the induction tube and the connections for delivering the rich mixture, a butterfly valve 22 is preferably provided between the throat 19 and throttle valve 21. This valve is mounted off center so that it opens with air flow through the induction tube, and is provided with a spring 24 for resisting such opening.

The delivery of the rich mixture is regulated by valve means in the delivery tube 28. Such means comprise a butterfly valve 37 in the tube, and operating connections 38 between this valve and the throttle valve 21. The operating connections 38 are such that the opening of butterfly valve 37 is increased with opening of the throttle valve 21, so that the area of the orifice past the valve is increased with lessening of the vacuum inwardly of the throttle valve as the throttle is opened wide.

A secondary advantage of the carburetor is that the delivery of fuel directly to the intake valves of the engine cylinders permits the use of a relatively heavy grade of fuel.

What I claim is:

1. In a carburetor comprising an air supply system having a throttle valve therein and an induction tube; a chamber in communication with the induction tube and into which fuel is induced by a pressure differential created by air flow through the induction tube, connections arranged to receive fuel from said chamber and deliver it directly to the separate cylinders of the engine with which the carburetor is employed, and automatically operating valve means in the induction tube arranged to maintain a pressure differential for insuring passage of the total fuel charge at all times through said chamber and connections.

2. In a carburetor comprising an air supply system having a throttle valve therein and an induction tube; a chamber in communication with the induction tube and into which fuel is induced by a pressure differential created by air flow through the induction tube, connections arranged to receive fuel from said chamber and deliver it directly to the intake valve of the separate cylinders of the engine with which the carburetor is employed, and automatically operating valve means in the induction tube arranged to maintain a pressure differential for insuring the passage of the total fuel charge at all times through said chamber and connections.

3. In a carburetor comprising an air supply system having a throttle valve therein and an induction tube; a chamber in communication with the induction tube and into which fuel is induced by a pressure differential created by air flow through the induction tube, a common fuel connection arranged to receive fuel from said chamber, branch connections leading directly to the separate cylinders of the engine with which the carburetor is employed, means in the induction tube for insuring passage of the total fuel charge at all times through said chamber and connections, and automatically operated valve means in said common connection.

4. In a carburetor comprising an air supply system having a throttle valve therein and an induction tube; a chamber in communication with the induction tube and into which fuel is induced by a pressure differential created by air flow through the induction tube, a common fuel connection arranged to receive fuel from said chamber, branch connections leading directly to the separate cylinders of the engine with which the carburetor is employed, means in the induction tube for insuring passage of the total fuel charge at all times through said chamber and connections, and valve means in said common connection arranged to be operated by movement of the throttle valve.

5. In a carburetor comprising an air supply system having a throttle valve and an induction tube; a chamber in communication with the induction tube and into which fuel is induced by a pressure differential created by air flow through the induction tube, fuel delivery connection from said chamber to the air supply system inwardly of the throttle, automatically operating valve means to maintain a pressure differential in the induction tube for insuring passage of fuel at all times through said chamber and connection, and valve means in said fuel delivery connection arranged to be operated by movement of the throttle valve.

6. In a carburetor comprising an air supply system having a throttle valve and an inducting tube; a chamber in communication with the induction tube and into which fuel is induced by a pressure differential created by air flow through the induction tube, fuel delivery connection from said chamber to the air supply system inwardly of the throttle, and automatically operating valve means to maintain a pressure differential in the induction tube for insuring the passage of the total fuel charge at all times through said chamber and connection.

In witness whereof, I hereunto set my hand.

BRYANT BANNISTER.